(12) United States Patent
Kidron et al.

(10) Patent No.: US 9,419,972 B2
(45) Date of Patent: Aug. 16, 2016

(54) TWO DIMENSIONAL DIRECT MEMORY ACCESS SCHEME FOR ENHANCED NETWORK PROTOCOL PROCESSING PERFORMANCE

(75) Inventors: Amihai Kidron, Portland, OR (US); Yaniv Frishman, Kiryat Ono (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,332

(22) PCT Filed: Mar. 30, 2012

(86) PCT No.: PCT/US2012/031610
§ 371 (c)(1),
(2), (4) Date: Dec. 6, 2013

(87) PCT Pub. No.: WO2013/147872
PCT Pub. Date: Oct. 3, 2013

(65) Prior Publication Data
US 2014/0149743 A1 May 29, 2014

(51) Int. Cl.
*H04L 29/06* (2006.01)
*G06F 21/85* (2013.01)
(52) U.S. Cl.
CPC ............ *H04L 63/0869* (2013.01); *G06F 21/85* (2013.01)
(58) Field of Classification Search
CPC ...................................................... G06F 13/28
USPC ......................................................... 713/193
See application file for complete search history.

(56) References Cited

U.S. PATENT DOCUMENTS

| | | | |
|---|---|---|---|
| 7,913,177 B1 * | 3/2011 | Smith et al. .................... | 715/762 |
| 8,209,446 B2 * | 6/2012 | Go et al. .......................... | 710/22 |
| 8,271,700 B1 * | 9/2012 | Annem ..................... | G06F 13/28 |
| | | | 710/22 |
| 2004/0010612 A1 | 1/2004 | Pandya | |
| 2005/0289253 A1 | 12/2005 | Edirisooriya et al. | |
| 2010/0031060 A1 * | 2/2010 | Chew et al. .................... | 713/193 |
| 2012/0159016 A1 * | 6/2012 | Morita ............................ | 710/33 |

OTHER PUBLICATIONS

International Search Report, PCT/ISA/210, Oct. 30, 2012, total of 3 sheets.

* cited by examiner

*Primary Examiner* — Morshed Mehedi
*Assistant Examiner* — Khalil Naghdali
(74) *Attorney, Agent, or Firm* — Pillsbury Winthrop Shaw Pittman LLP

(57) ABSTRACT

Systems and methods are directed to a memory device that includes a plurality of memory buffers and a direct memory access (DMA) descriptor structure. The DMA descriptor structure comprises a transfer command and associated data transfer information and encryption/decryption information that is configured in a two dimensional, tree-linked structure. A DMA controller that is communicatively coupled to the memory device transfers data to/from the memory buffers and encrypts/decrypts the data based on the transfer command and data transfer information and encryption/decryption information provided by the two dimensional, tree-linked DMA descriptor structure.

18 Claims, 4 Drawing Sheets

TWO DIMENSIONAL DIRECT MEMORY ACCESS SCHEME FOR ENHANCED NETWORK PROTOCOL PROCESSING PERFORMANCE

CROSS REFERENCE TO RELATED APPLICATIONS

This application is the U.S. National Stage of PCT/US2012/031610, filed Mar. 30, 2012, the contents of which are hereby incorporated by reference herein in its entirety.

TECHNICAL FIELD

This disclosure relates generally to the field of data processing, and in particular, to a direct memory access scheme.

BACKGROUND ART

This disclosure relates generally to the field of data processing, and in particular, to a direct memory access scheme.

In order to relieve host processors of the burden of transferring data between input/output (I/O) devices and memory as well as memory-to-memory, such operations are often accomplished by means of devices such as direct memory access (DMA) controllers and I/O controllers. DMA schemes enable I/O devices to transfer data directly to and from memory, via a system bus infrastructure, without much intervention by the host processor, as DMA controllers manage the data transfers and arbitrate access to the system bus infrastructure.

DMA schemes often employ DMA descriptors that define the source, target (i.e., destination), and size of the data transfer as well as control settings. DMA descriptors may specify an I/O device as a source or target via a reference to an I/O address or memory-mapped I/O address for the I/O device. The DMA descriptors may specify source and target memory buffers via references to scatter-gather lists that point to scattered/non-contiguous memory buffer locations/fragments. The scatter-gather lists include information such as the source memory buffer location indicating where the data is to be transferred from, target memory buffer location indicating where the data is to be transferred to, the number of bytes to be transferred, etc. Both the DMA descriptors and scatter-gather lists take the form of a one dimensional list that link other descriptors and lists sequentially.

Furthermore, transfer operations are often accompanied by encryption/decryption processing to provide data security. For example, transfer-to-target operations may include write transfers with encryption processing while transfer-from-source operations include read transfers with decryption processing. The encryption/decryption processing is typically performed by an independent cryptographic engine, separate from the DMA controller, that provides encryption and decryption services to the associated data.

However, ever-increasing data rates and the complexities associated therewith present throughput challenges for conventional DMA schemes. For example, because DMA controllers may handle simultaneous transactions for multiple I/O devices, memory buffer-to-memory buffer transfers impact the speed by which multiple transfer-with-data-processing transactions are completed. This is particularly true in communication network environments, where network protocol data rates are growing and protocol packet processing, along with associated encryption/decryption processing, becomes more complex.

DETAILED DESCRIPTION

Figure 1:
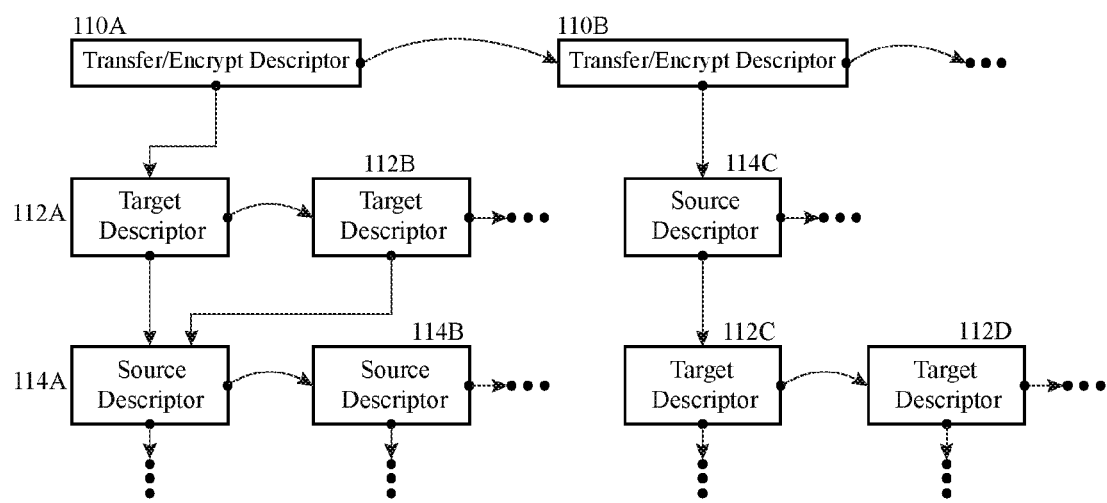
FIG. 1 depicts a high-level functional block diagram of a two-dimensional DMA descriptor structure that improves processing performance, in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a direct memory access (DMA) scheme having a two-dimensional, tree-linked, descriptor structure that improves processing performance.

For example, in one embodiment, a system is presented that includes a memory device having a plurality of memory buffers and a direct memory access (DMA) descriptor structure. The DMA descriptor structure comprises a transfer command and associated data transfer information and encryption/decryption information that is configured in a two dimensional, tree-linked structure. A DMA controller that is communicatively coupled to the memory device, transfers data to/from the memory buffers and encrypts/decrypts the data based on the transfer command and data transfer information and encryption/decryption information provided by the two dimensional, tree-linked DMA descriptor structure.

In another embodiment, a method is presented for providing a direct memory access (DMA) descriptor structure in a memory device that comprises a transfer command and associated data transfer information and encryption/decryption information that is configured in a two dimensional, tree-linked structure. The method further provides transferring data to/from the memory device and encrypting/decrypting the data, via a DMA controller, based on the transfer command and data transfer information and encryption/decryption information provided by the DMA descriptor structure.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Figure 3:
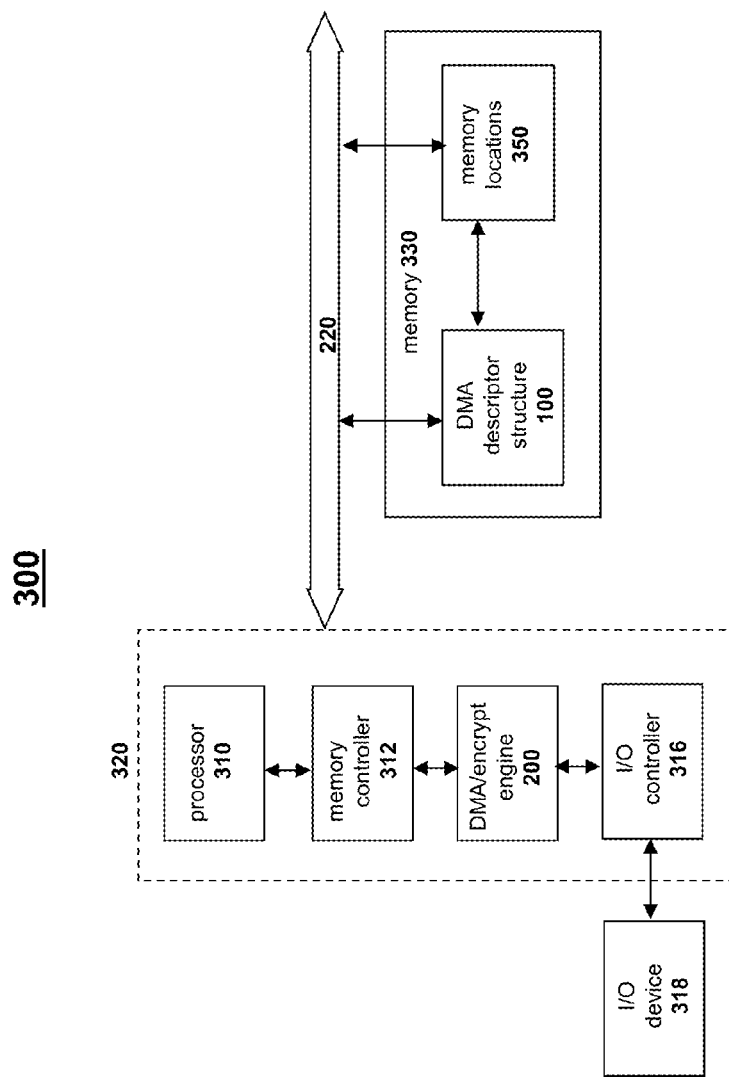
FIG. 3 depicts a high-level functional block diagram of a system employing a two-dimensional DMA descriptor structure, in accordance with various aspects of the present disclosure.

By way of review, FIG. 3 illustrates a high-level functional block diagram of system 300 that employ a two-dimensional DMA descriptor structure, in accordance with various aspects of the present disclosure. System 300 may represent any of a number of electronic and/or computing devices that may include a memory device with a self-refresh mode. Such electronic and/or computing devices may include servers, desktops, laptops, mobile devices, smart phones, gaming devices, tablet computers, networking devices, etc. In the illustrated embodiment, system 300 includes a module 310 comprising processor 310, memory controller 312, DMA/encryption engine 200, and I/O controller 316. Module 320 is communicatively coupled to memory device 330 (e.g., a DRAM) via a bus infrastructure 220. In alternative embodiments, system 300 may include more elements, fewer elements, and/or different elements. Moreover, although system 300 may be depicted as comprising separate elements, it will be appreciated that such elements may be integrated onto one platform or chipset.

System 300 may comprise one or more processors 310 which are configured to perform actions in response to executing instructions of an operating system, device drivers, applications, basic input/output system (BIOS) routines, and/or some other software or firmware.

Memory controller 312 is coupled to a memory 330 via a bus infrastructure 220. Memory 330 may comprise memory devices having addressable memory buffer locations 350 that may be read from and/or written to. Memory 330 may comprise one or more different types of memory devices such as, for example, dynamic random access memory (DRAM) devices, synchronous dynamic random access memory (SDRAM) devices, double data rate (DDR) SDRAM devices, and/or other volatile or non-volatile memory devices. Memory 330 includes DMA descriptor structure 100 described in detail below.

Memory controller 312 is also coupled to direct memory access (DMA)/encryption engine 200. The DMA/encryption engine 200 may process DMA descriptor structure 100 and perform atomic read, write, transfer, encrypt, and decrypt transactions that involve memory locations 350 and/or I/O devices 318 pursuant to DMA descriptor structure 100. I/O devices 318 may comprise a mouse, keyboard, video controller, network interface controller, hard disk, floppy disk, touch screens, wireless receivers, wireless transmitters, etc.

Typically, multiple DMA channels are used to support simultaneous DMA requests from different I/O devices in which a host receives transaction requests from these devices via a bus infrastructure. The host configures the DMA channels, in accordance with DMA descriptor tables that contain DMA-related information, such as, the transfer count, source of data and destination of data. The DMA descriptor tables are configured as one-dimensional lists. The DMA engine then fetches the DMA descriptor tables from memory, scans the tables, reads the descriptor information, and executes the operations in accordance with the scripted information.

By way of example, as multiple fragments of a protocol data unit (PDU) are received over a network, these fragments may need to be copied into multiple scattered buffers in memory. Upon the last fragment being received to complete the PDU, the processing as defined by the transaction information listed in the one-dimensional DMA descriptor tables, may require that the encryption/decryption and copy transactions be performed on a segment by segment basis, including configuring the encryption/decryption engine for each segment. In other words, conventional one-dimensional DMA descriptors may require processing of each PDU fragment including the configuration of the fragment's target and encryption/decryption parameters separately, thereby burdening processing resources and compromising throughput efficiency.

In contrast to conventional the one-dimensional DMA descriptors noted above, FIG. 1 depicts a high-level functional block diagram of a two-dimensional DMA descriptor structure 100, in accordance with various aspects of the present disclosure. As will be explained below, DMA descriptor structure 100 provides a configuration that simplifies the processing of a complex list of transactions. For example, by virtue of the DMA descriptor structure 100, a single encryption/decryption descriptor and a single target descriptor may suffice to complete a complex set of multiple transactions. Moreover, due to the flexible nature of DMA descriptor structure 100, both the software and hardware can make use of the DMA descriptor structure 100, as software structures can be mapped onto hardware structures to integrate both software and hardware.

To this end, as shown in FIG. 1, DMA descriptor structure 100 comprises a two-dimensional, tree-linked, configuration that includes transfer/encrypt descriptors 110A, 110B, target descriptors 112A, 112B, 112C, 112D, and source descriptors 114A, 114B, 114C. DMA descriptor structure 100 is configured to describe transfer operation characteristics (e.g. read, write, etc.) and encryption/decryption process attributes for all associated data including parallel and sequential transfer/encrypt descriptors as well as parallel and sequential target and source descriptors within the tree-linked structure. As will be described in detail below, DMA descriptor structure 100 is configured such that each of the descriptors includes two pointers to accommodate both vertically- and horizontally-linked information. For example, vertically-linked information typically encompasses information connecting transfer/encryption descriptors to target and/or source descriptors while horizontally-linked information encompasses information connecting like descriptors, such as, transfer/encryption descriptors to other transfer/encryption descriptors or target descriptors to other target descriptors, etc.

The transfer/encrypt descriptors 110(A-B) are configured to provide target or source descriptor, subsequent transfer/encrypt descriptor, and network-protocol specific encryption/decryption information. The transfer/encrypt descriptor 110 (A-B) structure comprises pointer information indicating a next transfer/encrypt descriptor and pointer information indicating a down target descriptor or down source descriptor as well as encryption/decryption information, such as, for example, encryption/decryption credentials, encryption/decryption keys, algorithms, etc. for the tree structure linked to the corresponding transfer/encrypt descriptor.

For example, in the non-limiting embodiment illustrated by FIG. 1, transfer/encrypt descriptor 110A includes pointer information to target descriptor 112A as well as pointer information to transfer/encrypt descriptors 110B while in turn transfer/encrypt descriptor 110B includes pointer information to source descriptor 114C. As such, upon completing the transactions, including applying the network protocol specific encryption/decryption information, for the section of the tree structure corresponding to transfer/encrypt descriptor 110A, processing will commence with the transactions and encryption/decryption information specified by transfer/encrypt descriptor 110B.

The target descriptors 112(A-D) are configured to describe the targeted or destination memory buffer locations as well as a source descriptor 114. As such, target descriptor structure 112(A-D) comprises a memory buffer target address and length (e.g., number of bytes to be copied), pointer information indicating a down source descriptor 114(A-C), and pointer information indicating a subsequent target descriptor. In addition, target descriptor structure 112(A-D) may further include offset to the relative address in the linked source descriptor buffer and encryption bypass information which provides an option to bypass DMA/encryption engine 200 for all transactions linked to the target descriptor. As illustrated in the embodiment of FIG. 1, target descriptor 112A includes pointer information to down source descriptor 114A while also including pointer information for next target descriptor 112B.

The source descriptors 114(A-C) are configured to describe source memory buffer locations. As such, source descriptor structure 114(A-C) comprises a memory buffer source address and buffer length, pointer information indicating a next source descriptor 114(A-C), pointer information indicating a target descriptor, and encryption bypass information which provides an option to bypass DMA/encryption engine 200 for the specific source memory buffer. As shown in FIG. 1, source descriptor 114A includes pointer information for next source descriptor 114B while source descriptor 114C includes pointer information for target descriptor 112C.

The two-dimensional configuration of DMA descriptor structure 100 described above facilitates DMA processing by providing relevant information that is both vertically- and horizontally-linked. As such, the two-dimensional, tree-linked DMA descriptor structure 100 provides a flexible configuration that enables the processing of complex DMA transactions, including multiple data transfers from multiple sources to multiple targets in contiguous or scattered memory locations, as well as conducting multiple encryptions and decryptions, based on a single command comprising an encryption/decryption descriptor and a single target descriptor.

Figure 2:
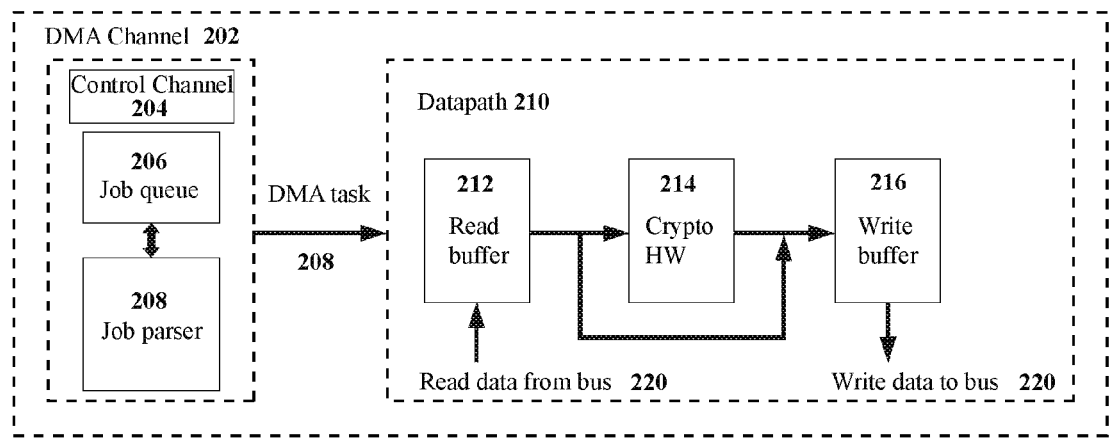
FIG. 2 depicts a high-level functional block diagram of an integrated DMA/encryption engine, in accordance with various aspects of the present disclosure.

FIG. 2 depicts a high-level functional block diagram of an integrated DMA/encryption engine 200, in accordance with various aspects of the present disclosure. As will be described below, DMA/encryption engine 200 further improves transfer and encryption/decryption operations by integrating the functionality of both operations.

In one non-limiting embodiment, the integrated DMA/encryption engine 200 may exploit DMA descriptor structure 100, described above, to further improve processing throughput. Along these lines, as shown in FIG. 2, DMA channel 202 of DMA/encryption engine 200 includes control channel 204 comprising job queue 206 and job parser 208. Job queue 206 is configured to receive a pointer indicative of a transfer/encrypt descriptor 110 and scans the transfer/encrypt descriptor 110. As noted above, transfer/encrypt descriptor 110 manifests a two-dimensional, tree-linked configuration that describes transfer operation characteristics (e.g. read, write, etc.) and encryption/decryption process attributes for all associated data including parallel and sequential transfer/encrypt descriptors as well as parallel and sequential target and source descriptors.

In response to the job queue 206 performing the scan of the tree-linked information provided by transfer/encrypt descriptor 110, job parser 208 is configured to parse or deconstruct the transfer and encryption/decryption operations, as defined by transfer/encrypt descriptor 110, to form one or more atomic DMA command task(s). These atomic DMA command tasks provide for all the processing transactions as well as identify the associated buffer memory source locations, buffer memory target locations, data lengths, and encryption/decryption engine configurations that are included within the tree structure of corresponding transfer/encrypt descriptor 110.

Upon establishing the atomic DMA command tasks for the operations defined by transfer/encrypt descriptor 110, control channel 204 forwards the atomic command tasks to datapath 210. Datapath 210 comprises read buffer 212, cryptography module 214, and write buffer 216, which function to provide combined transfer and encryption/decryption operations. That is, a data transfer operation is initiated by accessing a buffer memory source location specified in the atomic DMA command tasks, via I/O bus infrastructure 220. The data is read from the specified buffer memory source location and forwarded to read buffer 212, via I/O bus infrastructure 220.

Read buffer 212 reads the data and either forwards the data to cryptography module 214 to encrypt/decrypt the data or bypasses cryptography module 214 to forward the data to write buffer 216, based on encryption/decryption engine configuration defined by the DMA command tasks. The data, whether encrypted, decrypted, or in original form, is received by write buffer 216 which supplies the data to the specified buffer memory target location, via I/O bus infrastructure 220. The read buffers 212 and write buffers 216 operate to access memory and I/O devices in bursts rather than sequentially, thereby increasing the efficiency of DMA transfers.

In so doing, the data transfer and encryption/decryption operations are functionally combined to reduce the processing time required for such operations. Moreover, the amount of data transfers is also reduced due to the integrated DMA/encryption engine 200, as opposed to conventional DMA and cryptographic operations, which are performed separately requiring more memory and I/O accesses performed, such as copying from source to destination, reading destination, performing cryptographic tasks, rewriting to the destination, etc. Thus, by exploiting the two-dimensional, tree-linked DMA descriptor structure 100, the integrated DMA/encryption engine 200 can efficiently execute complex multiple data transfers from multiple sources and to multiple targets, as well as conduct multiple encryptions and decryptions.

Figure 4:
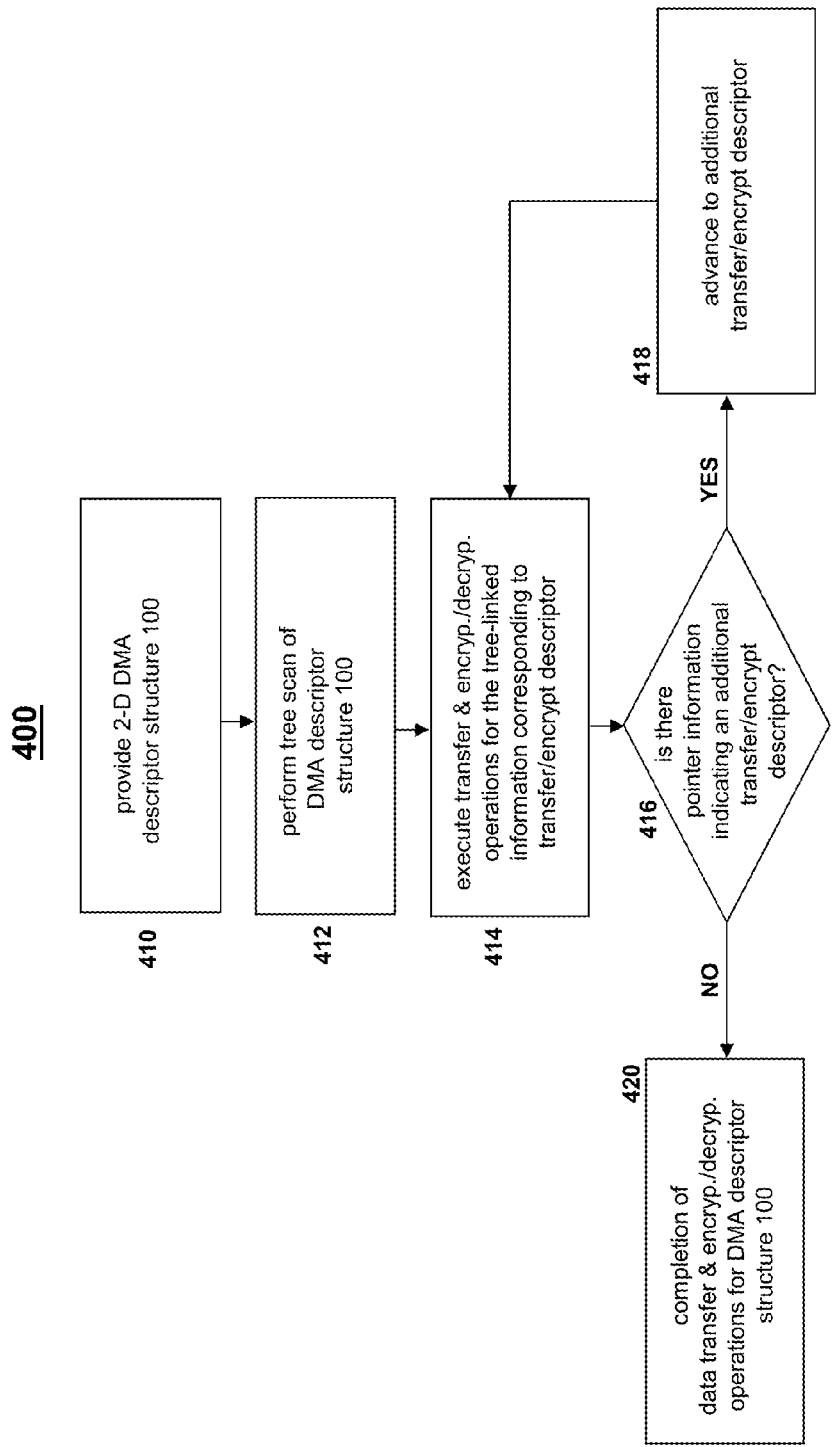
FIG. 4 depicts a high-level flow diagram of a process for transferring and encrypting/decrypting data, in accordance with various aspects of the present disclosure.

Consistent with the embodiments and implementations disclosed above, FIG. 4 illustrates process 400 for transferring and encrypting/decrypting data, in accordance with various aspects the present disclosure. Process 400 commences with block 410, in which the two-dimensional DMA descriptor structure 100 is provided in memory 330. DMA/encryption engine 200 then fetches the DMA descriptor structure 100 from memory 330.

In block 412, DMA/encryption engine 200 performs a tree scan of DMA descriptor structure 100. The tree scan may entail reading the pointer information, data transfer information, and encryption/decryption information provided by the vertically- and horizontally-linked transfer/encryption descriptors 110A-B, target descriptors 112A-D, and source descriptors 114A-C.

In block 414, the DMA/encryption engine 200 executes the transfer and encryption/decryption operations in accordance with the tree-linked data transfer information and encryption/decryption information of DMA associated with transfer/encryption descriptor 110A of descriptor structure 100. The execution of such operations may entail parsing or deconstructing the transfer and encryption/decryption operations to form one or more atomic DMA command task(s), accessing and reading data of buffer memory source location specified in the atomic tasks, encrypting/decrypting the data or bypassing the cryptographic operations, and writing the processed data into the buffer memory target location specified in the atomic tasks.

After the completion of the transfer and encryption/decryption operations for the tree corresponding to transfer/encryption descriptor 110A, process 400 determines, at block 416, whether transfer/encryption descriptor 110A includes a pointer to an additional transfer/encryption descriptor, such as, for example, transfer/encryption descriptor 110B. If so, process 400 progresses to block 418 where the DMA/encryption engine 200 advances or jumps to the additional transfer/encryption descriptor and executes the transfer and encryption/decryption operations in accordance with the tree-linked data transfer information and encryption/decryption information associated with the additional transfer/encryption descriptor of DMA descriptor structure 100, in the manner as discussed above.

If transfer/encryption descriptor 110A does not include a pointer to an additional transfer/encryption descriptor, then the transfer information and encryption/decryption operations for DMA descriptor structure 100 are complete, as indicated at block 420.

With this said, it will be appreciated that, in various embodiments, DMA descriptor structure 100 and integrated DMA/encryption engine 200 may be implemented in hardware, software or firmware, and may also run on special purpose or general purpose computing platforms. The execution and control of various aspects may be implemented via one or more microprocessors or microcontrollers such as those made by Intel Corporation of Santa Clara, Calif. (although other vendors may be used). In certain embodiments, given high throughput requirements of certain communication systems, DMA descriptor structure 100 and integrated DMA/encryption engine 200 may run on more dedicated on-chip computing engines.

In other embodiments, DMA descriptor structure 100 and integrated DMA/encryption engine 200 may be implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). Moreover, the methods for executing the various operations noted may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor.

In yet other embodiments, in which certain network components are implemented in hardware, DMA descriptor structure 100 and integrated DMA/encryption engine 200 may be implemented with firmware drivers and register maps of related hardware.

Having thus described the novel concepts and principles of the optimization of DMA processing, it will be apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. The alterations, improvements, and modifications are intended to be suggested by this disclosure, and are within the spirit and scope of the exemplary aspects of this disclosure. Additionally, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

What is claimed is:

1. A system comprising:
a memory device including a plurality of memory buffers and a direct memory access (DMA) descriptor structure, the DMA descriptor structure comprising a transfer command and associated data transfer information and encryption/decryption information that is configured in a two dimensional, tree-linked structure, wherein, according to the two dimensional, tree-linked structure, the transfer command includes a pointer to link the DMA descriptor structure to an additional transfer command in a first dimension and a pointer to link the DMA descriptor structure to target descriptor information or source descriptor information in a second dimension; and
a DMA controller communicatively coupled to the memory device, the DMA controller configured to transfer data to/from the memory buffers and encrypt/decrypt the data based on the transfer command and data transfer information and encryption/decryption information provided by the DMA descriptor structure, and then advance to the additional transfer command to process information thereof, wherein the DMA descriptor structure is to enable processing of DMA transactions including one or more data transfer operations and one or more encryption/decryption operations.

2. The system of claim 1, wherein the transfer command of the DMA descriptor structure comprises the tree-linked data transfer and encryption/decryption information for a set of transactions corresponding to the transfer command.

3. The system of claim 1, wherein the target descriptor information includes pointer information to an additional target descriptor information and source descriptor information and target information representing destination memory buffer locations and length of data.

4. The system of claim 3, wherein target information further includes information to optionally bypass encryption/decryption operations for the data corresponding to the target descriptor information.

5. The system of claim 1, wherein the source descriptor information includes pointer information to an additional source descriptor information and an additional target descriptor information and source information representing source memory buffer locations and buffer length.

6. The system of claim 5, wherein source information further includes information to optionally bypass encryption/decryption operations for a memory buffer.

7. The system of claim 2, wherein, upon processing the tree-linked data transfer and encryption/decryption information for the set of transactions corresponding to the transfer command, the DMA controller is configured to process tree-linked data transfer and encryption/decryption information for an additional set of transactions corresponding to the additional transfer command.

8. The system of claim 1, wherein the DMA controller includes an integrated cryptographic module to perform encryption/decryption of the data to be transferred.

9. The system of claim 1, wherein the DMA controller deconstructs the transfer command and associated tree-linked data transfer information and encryption/decryption information of the DMA descriptor structure into atomic-level tasks and processes the atomic-level tasks.

10. A method comprising:
providing a direct memory access (DMA) descriptor structure in a memory device that comprises a transfer command and associated data transfer information and encryption/decryption information that is configured in a two dimensional, tree-linked structure, wherein, according to the two dimensional, tree-linked structure, the transfer command includes a pointer to link the DMA descriptor structure to an additional transfer command in a first dimension and a pointer to link the DMA descriptor structure to target descriptor information or source descriptor information in a second dimension;
transferring data to/from the memory device and encrypting/decrypting the data, via a DMA controller, based on the transfer command and data transfer information and encryption/decryption information provided by the DMA descriptor structure; and advancing, via the DMA controller, to the additional transfer command to process information thereof,
wherein the DMA descriptor structure is to enable processing of DMA transactions including one or more data transfer operations and one or more encryption/decryption operations.

11. The method of claim 10, wherein the transfer command of the DMA descriptor structure comprises the tree-linked data transfer and encryption/decryption information for a set of transactions corresponding to the transfer command.

12. The method of claim 10, wherein the target descriptor information includes pointer information to an additional target descriptor information and source descriptor information and target information representing destination memory buffer locations and length of data.

13. The method of claim 12, wherein target information further includes information to optionally bypass encryption/decryption operations for the data corresponding to the target descriptor information.

14. The method of claim 10, wherein the source descriptor information includes pointer information to an additional source descriptor information and an additional target descriptor information and source information representing source memory buffer locations and buffer length.

15. The method of claim 14, wherein source information further includes information to optionally bypass encryption/decryption operations for a memory buffer.

16. The method of claim 11 further including, upon processing the tree-linked data transfer and encryption/decryption information for the set of transactions corresponding to the transfer command,
processing the tree-linked data transfer and encryption/decryption information for an additional set of transactions corresponding to the additional transfer command.

17. The method of claim 10, wherein the DMA controller includes an integrated cryptographic module to perform encryption/decryption of the data to be transferred.

18. The method of claim 10, further including
deconstructing, by the DMA controller, the transfer command and associated tree-linked data transfer information and encryption/decryption information of the DMA descriptor structure into atomic-level tasks, and
processing the atomic level task.

* * * * *